United States Patent [19]
Sutherland

[11] 3,920,512
[45] Nov. 18, 1975

[54] SHIELD PLUG ACCESS ENCLOSURE FOR A NUCLEAR REACTOR

[75] Inventor: John D. Sutherland, Monroeville, Pa.

[73] Assignee: Westinghouse Electric Corporation, Pittsburgh, Pa.

[22] Filed: Apr. 17, 1973

[21] Appl. No.: 351,923

Related U.S. Application Data

[63] Continuation of Ser. No. 114,629, Feb. 11, 1971, now Defensive Publication No. 901,028.

[52] U.S. Cl. ................................ 176/87; 176/27
[51] Int. Cl. ............................................ G21c 19/20
[58] Field of Search .............................. 176/87, 27

[56] References Cited
UNITED STATES PATENTS

3,282,793  11/1966  Jamrog ............................ 176/27

Primary Examiner—Benjamin A. Borchelt
Assistant Examiner—C. T. Jordan
Attorney, Agent, or Firm—D. C. Abeles

[57] ABSTRACT

The shield plug of a liquid metal cooled fast breeder reactor which uses a hot cell refueling system has a metal access enclosure sealed to its upper surface. The enclosure contains the control rod drive mechanisms, reactor closure bolts and other components as are generally mounted on a shield plug, and an air atmosphere is provided within the enclosure. A horizontally extending bellows-like structure allows personnel access to the enclosure from the exterior of the hot cell.

3 Claims, 3 Drawing Figures

SHIELD PLUG ACCESS ENCLOSURE FOR A NUCLEAR REACTOR

This is a continuation of application Ser. No. 114,629 filed Feb. 11, 1971 published in 901 O.G. 778, Aug. 15, 1972 as Defensive Publication T901,028.

BACKGROUND OF THE INVENTION

This invention pertains to hot cell refueling systems for nuclear reactors which utilize a liquid metal heat transfer medium, and more particularly to subsystems which allow personnel access to the shield plug area of such a hot cell.

Hot cell refueling systems have recently been considered as effective means for safely refueling liquid metal cooled nuclear reactors. Such systems utilize an inert gas filled hot cell constructed about the reactor for remote refueling of same after the shield plug has been removed. However, before the shield plug is removed, a number of essential operations must be performed on or near the plug; for example, the closure bolts must be removed prior to removal of the shield plug for refueling.

It has been suggested that the necessary operations be performed using remote manipulators or by personnel wearing special environmental suits with breathing apparatus. However, such approaches tend to be inefficient, time consuming and costly.

A recently issued patent—U.S. Pat. No. 3,282,793 of A. R. Jamrog filed Mar. 3, 1966 —discloses the use of a large vertical bellows to provide an air atmosphere for the environs of the shield plug and to provide personnel access thereto. The arrangement disclosed will not permit removal of the reactor closure bolts from inside of the bellows nor would it permit storage of the shield plug on the floor adjacent to the opening into the reactor. Further, the result of such an arrangement is to necessitate an extremely high domed reactor enclosure building or containment system.

SUMMARY OF THE INVENTION

In accordance with this invention, a hot cell refueling system is provided which includes a steel access enclosure which is sealed to the top of the reactor shield plug and encloses the control rod drive mechanisms, reactor closure bolts and other components mounted on the shield plug.

Entrance to the access enclosure from the shielded viewing area exterior to the hot cell is gained through an expandible fabric and metal bellows. This bellows is attached to the wall of the hot cell and operated by a double scissors assembly driven by electric motors and jack screws. Double access doors may be provided on one door attached to the access enclosure and the other to the bellows. A shielded access plug in the viewing area wall is provided for sealing the hot cell during refueling operations. Inflatable seals are also provided to seal the bellows to the access enclosure and the access plug to the wall.

Within the access enclosure an individual sealing dome is also provided over each reactor closure bolt hole. These bolt sealing domes provide a seal between the access enclosure and the hot cell atmosphere when the shield plug is removed from the reactor. O-rings may be situated at each bolt hole to provide a seal both while the shield plug is in place and when same is removed from the vessel.

In operation the access plug in the viewing area wall is removed and the access tunnel extended and sealed to the access enclosure. The space between the access doors may then be purged to air and the doors opened permitting personnel access into the access enclosure. Working inside the access enclosure personnel may then disconnect the control rod drives retracting instrumentation and remove the reactor closure bolts. After each individual closure bolt is removed a bolt sealing dome is bolted over the bolt hole and the interior of the sealing dome purged to argon. After personnel evacuation the access doors are closed and the space between them purged to argon. The access tunnel may then be retracted and the access plug in the viewing area wall replaced.

DESCRIPTION OF THE DRAWINGS

For a better understanding of the invention, reference may be had to the accompanying illustrative embodiment of the invention, in which.

DESCRIPTION OF A PREFERRED EMBODIMENT

Figure 1:
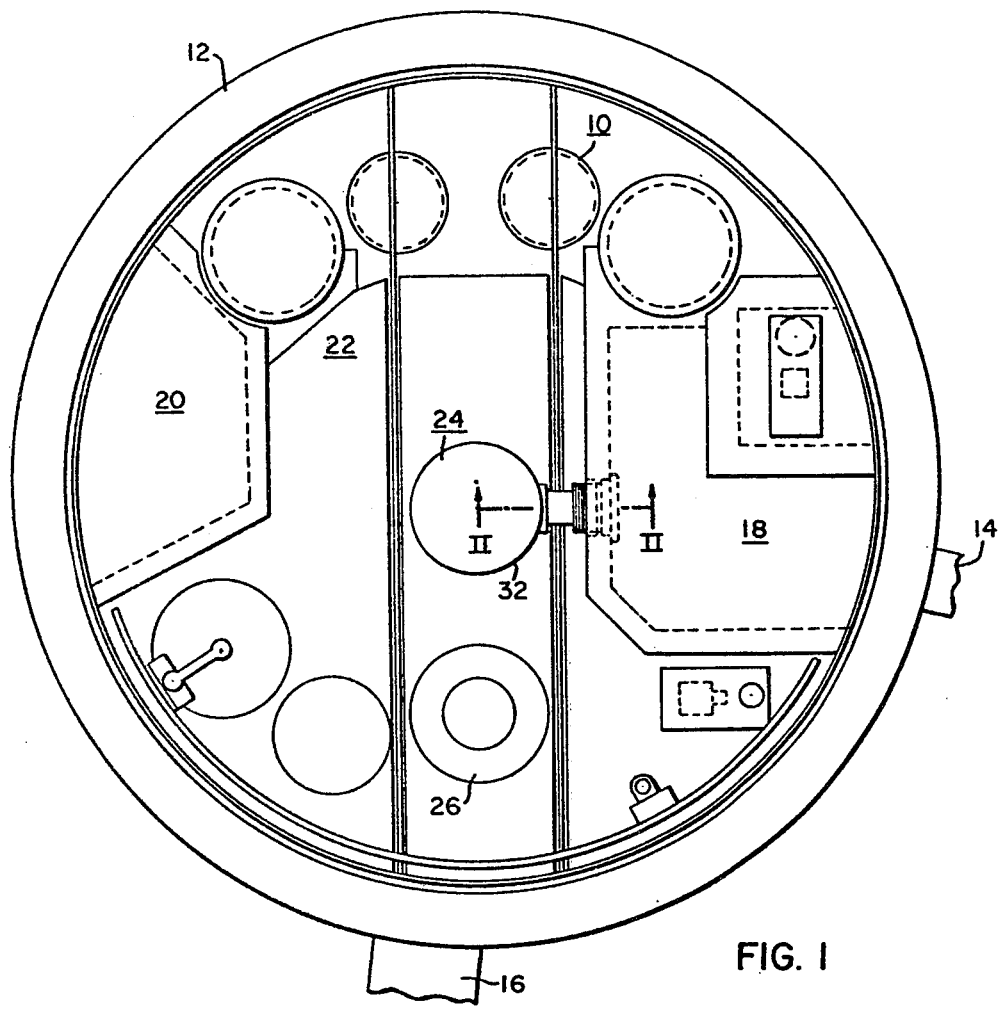
FIG. 1 shows a plan view of the reactor containment system indicating the arrangement of the refueling cell and access means in accordance with this invention.

Referring to the plan view of FIG. 1, there is shown a refueling cell 10 surrounded by a wall 12 and having personnel access lock 14 and a fuel transfer lock 16.

The refueling cell 10 includes two viewing galleries 18 and 20. The inside of the refueling cell 10 is filled with an inert gas such as argon. In this region, refueling operations and other maintenance operations in connection with the nuclear reactor take place. The refueling cell 10 has a floor 22. Situated beneath the floor 22 is the nuclear reactor 24 and a fuel storage pit 25. Other equipment such as pumps, storage pits, etc., may also be included in the refueling cell 10 or beneath the floor 22 thereof.

The nuclear reactor 24 with which the system of the present invention is most useful is a liquid metal cooled nuclear reactor. Such reactors must be isolated from an air atmosphere, that is, an atmosphere which contains oxygen since the liquid metal usually used, such as liquid sodium, reacts with oxygen. For this reason the reactor is sealed inside of a refueling cell 10 which contains an inert atmosphere, as previously indicated.

Figure 2:
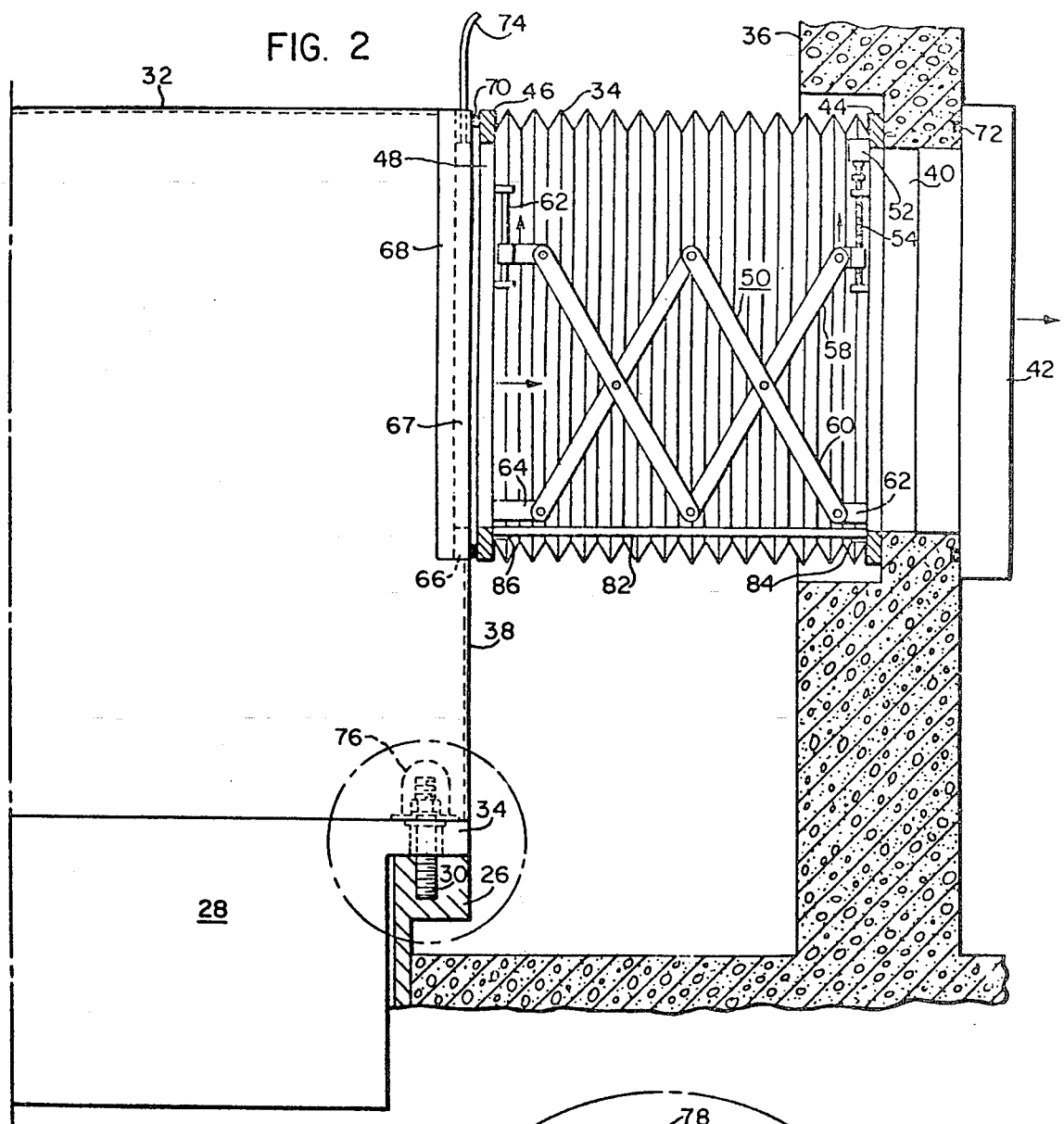
FIG. 2 shows a partial cross sectional view along lines II—II of FIG. 1 and showing details of the access enclosure and bellows-like member in accordance with this invention.
Figure 3:
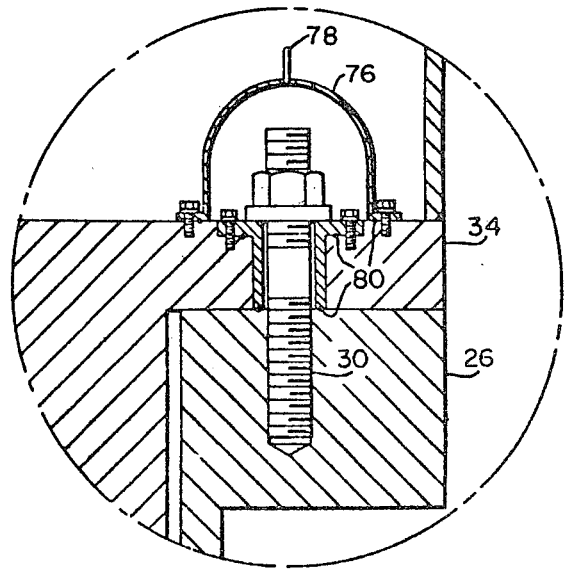
FIG. 3 is an expanded view of the bolt sealing arrangement shown in FIG. 2.

As is well known, the nuclear reactor 24 includes a pressure vessel, only the upper flange of which is shown in FIG. 2 and designated by the numeral 26, and a reactor shield plug 28 which is normally in a sealing relationship with the vessel and more specifically is bolted to the vessel flange 26 by means of a plurality of closure bolts 30. The reactor shield plug has mounted thereon a plurality of control mechanisms generally illustrated by reference character 27 which control neutron absorbing rods which are capable of being extended into and retracted from the nuclear core within the reactor 24.

It is desirable that the control rod mechanisms and their associated electrical control means neither be exposed to the inert atmosphere, nor be exposed to the sodium vapor which overlies the liquid sodium within the core of the reactor 24. Furthermore, because of the complexity of the electrical and mechanical structure in the vicinity of the reactor shield plug 28, maintenance eventually must be performed in this area. This maintenance is most easily performed by personnel who are unencumbered by space suits and breathing apparatus. For this reason also an air atmosphere should be provided for the immediate environments of the reactor shield plug 28. In order to provide such an atmosphere an access enclosure 32 is situated above the reactor shield plug 28 and sealed to the outwardly extending flange 34 thereof.

The access enclosure 32 should be sealed to the outwardly extending flange 34 of the reactor shield plug 28 outwardly of the bolts 30 so that personnel having access to the access enclosure 32 may also work on the bolts 30.

For purposes of providing access from the viewing gallery 18 to the access enclosure 32, a bellows-like member 35 is provided which extends from wall 36 of the viewing gallery 18 to the near wall 38 of the access enclosure 32. As can best be seen in FIG. 2, an opening 40 is provided in wall 36. This opening is normally closed by an access plug 42. Inwardly of the opening 40, an annular ring 44 is mounted on the wall 36 to whiich a metal and fabric bellowslike member 35 is sealed. The end of the bellows-like member 35 opposite the walls 36 is also provided with an annular ring 46 in which a door 48 is situated and sealed therein. In order to conveniently extend and retract the bellows-like member 35, two scissors assemblies 50 may be conveniently utilized. Each scissors assembly 50 may be driven by a drive motor 52 and jack screw 54. A ball and nut follower for the jack screw 54 is affixed to one leg 58 of the scissors assembly 50 and the opposing leg 60 is attached to an inwardly extending flange 62 affixed to the annular ring 44. The legs on the opposite ends of the scissors 50 are respectively affixed to a follower 63 and a fixed flange 64, both of which are in turn affixed to the annular ring 46.

The access enclosure 32 has an annular ring 66 therein, through which an opening 67 provides access for personnel into the access enclosure 32. When the bellows-like member 35 is in its retracted position, a door 68 seals the opening 67.

Expandable or inflatable seals 70 and 72 are conveniently provided for sealing the bellows-like member 35 around the opening in the annular member 66 and the access plug 42 in the wall 36, respectively.

A purge line 74 may also be provided through the annular ring 66 so that the volume within the opening 67 can be purged from inert gas to air before the doors 48 and 68 are opened to provide personnel access into the interior of the access enclosure 32.

Bolt sealing domes 76 are also provided; one for each bolt 30. The bolt domes 76 are utilized to seal the openings in the outwardly extending flange 34 of the reactor shield plug 28 when the bolts 30 are removed. If such domes 76 were not provided, the inert gas containing sodium vapor would seep into the interior of the access enclosure 32 when the shield plug 28 was removed from sealing relationship with the vessel flange 26, such as for example when the shield plug 28 and the access enclosure 32 with their associated structure were stored adjacent the reactor during refueling. The seepage of inert gas containing sodium vapor into the interior of the access enclosure 32 might result in deterioration of the mechanisms and electrical components therewithin. Each dome 76 should also be provided with a purge line 78 so that any inert gas which might have seeped into the dome 78 during reactor operations could be removed prior to removal of the sealing dome 76.

As further can be seen, a minimum of seepage to the interior of the access enclosure 32 may be assured by providing a plurality of O-ring seals 80 between joining members of the bolt assembly.

Accordingly, when personnel access to mechanisms in the environments of the reactor shield plug 28, such as control mechanisms or electrical devices is desired, the access plug 42 is first removed. The drive motors 52 are then actuated so as to extend the bellows-like member 35 into contact with the annular member 66 on the access enclosure 32. The inflatable seal 70 may then be actuated to assure integrity. The purge line 74 is then utilized to remove inert gas from the region between the doors 48 and 68 and replace same with air. A removable gangplank 82 may then be extended across the intervening space. Brackets 84 and 86 may be affixed to the annular members 44 and 46 respectively for this purpose. After the last mentioned purging operation, the viewing gallery 18, the space inside of the bellows-like member 34, the space between the doors 48 and 68 and the space within the access enclosure 32 are now all filled with air. Personnel may then proceed along the gang plank 82 and open the doors 48 and 68 and thus gain access to the access enclosure 32.

Before removing the bolts 30, the bolt domes 76 are purged of any inert gas through the purge line 78. The bolt domes 76 may then be removed, the bolts 30 removed and the bolt dome 76 replaced and the domes 76 purged with an inert gas.

After personnel egress from the access enclosure 32 and reversal of the previously enumerated operations, the shield plug 28, access enclosure 32, and associated structure can be removed from their position surmounting the vessel and stored on the floor 22 of the refueling cell 10.

I claim:

1. Apparatus for providing access to the immediate environs of a liquid metal cooled nuclear reactor comprising, in combination:

a sealed chamber having side walls, a ceiling, and a floor, said chamber being filled with an inert gas, said chamber further having an opening in a side wall thereof;

a nuclear reactor including a pressure vessel, a head closure removably sealed to said pressure vessel, and control rod drive mechanisms mounted on said closure head, said nuclear reactor being sealed in and through the floor of said chamber with the pressure vessel extending downwardly therefrom;

an access enclosure within said sealed chamber and forming a sealed enclosure over said reactor, closure head, and mechanisms, said access chamber having an opening, normally closed by a door, therein substantially opposite the opening in the chamber; and a bellows-like member sealed over said opening in said chamber and extending into said chamber, said bellows-like member being adapted to be extended to and into sealing engagement with said access enclosure about said door.

2. The device of claim 1 wherein the access enclosure is mounted on and sealed to the head closure.

3. The device of claim 2 wherein the bellows-like member, when extended, is oriented generally parallel to the floor of said chamber.

* * * * *